(12) United States Patent
Kong et al.

(10) Patent No.: US 11,936,030 B2
(45) Date of Patent: Mar. 19, 2024

(54) FABRICATION PROCESS TO MAKE ELECTRODES BY ROLLING

(71) Applicant: GM Global Technology Operations LLC, Detroit, MI (US)

(72) Inventors: Dewen Kong, Shanghai (CN); Xiaochao Que, Shanghai (CN); Meiyuan Wu, Shanghai (CN); Haijing Liu, Shanghai (CN); Xiaosong Huang, Novi, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 17/539,811

(22) Filed: Dec. 1, 2021

(65) Prior Publication Data

US 2022/0173370 A1 Jun. 2, 2022

(30) Foreign Application Priority Data

Dec. 2, 2020 (CN) .......................... 202011387727.1

(51) Int. Cl.
*H01M 4/04* (2006.01)
*H01M 4/1397* (2010.01)
(Continued)

(52) U.S. Cl.
CPC ....... *H01M 4/0435* (2013.01); *H01M 4/0404* (2013.01); *H01M 4/1397* (2013.01);
(Continued)

(58) Field of Classification Search
CPC .. H01M 4/0435; H01M 4/043; H01M 4/0404; H01M 4/0407; H01M 4/0402;
(Continued)

(56) References Cited

U.S. PATENT DOCUMENTS 4,295,952 A 10/1981 de Nora et al.
5,907,001 A 5/1999 Foucher et al.
(Continued)

FOREIGN PATENT DOCUMENTS

CN 102315022 A 1/2012
CN 103746089 A 4/2014
(Continued)

OTHER PUBLICATIONS

Fuller, et al. "Simulation and Optimization of the Dual Lithium Ion Insertion Cell", J. Electrochem. Soc., vol. 141, No. 1, Jan. 1994.
(Continued)

*Primary Examiner* — Raymond Alejandro
(74) *Attorney, Agent, or Firm* — Harness, Dickey & Pierce, P.L.C.

(57) ABSTRACT

A method of manufacturing an electrode for an electrochemical cell includes providing an admixture including an electroactive material, a binder, and a solvent. The method further includes rolling the admixture to form a sheet and forming a multi-layer stack from the sheet. The method further includes forming an electrode film precursor by performing a plurality of sequential rollings, each including rolling the stack through a first gap. The plurality of sequential rollings includes first and second rollings. In the first rolling, the stack is in a first orientation. In the second rolling, the stack is in a second orientation different from the first orientation. The method further includes forming an electrode film by rolling the electrode film precursor through a second gap less than or equal to the first gap. The method further includes drying the electrode film to remove at least a portion of the solvent.

18 Claims, 8 Drawing Sheets

(51) Int. Cl.
*H01M 4/30* (2006.01)
*H01M 10/058* (2010.01)
*H01M 10/0525* (2010.01)

(52) U.S. Cl.
CPC ........... *H01M 4/30* (2013.01); *H01M 10/058* (2013.01); *H01M 10/0525* (2013.01)

(58) Field of Classification Search
CPC ...... H01M 4/1397; H01M 4/139; H01M 4/30; H01M 10/058; H01M 10/0525
See application file for complete search history.

(56) References Cited

U.S. PATENT DOCUMENTS

| | | | |
|---|---|---|---|
| 7,018,607 B2 | 3/2006 | Nazri et al. |
| 7,736,805 B2 | 6/2010 | Nazri et al. |
| 8,101,152 B1 | 1/2012 | Halalay et al. |
| 8,148,455 B2 | 4/2012 | Posudievsky et al. |
| 8,399,138 B2 | 3/2013 | Timmons |
| 8,420,259 B2 | 4/2013 | Xiao et al. |
| 8,440,350 B1 | 5/2013 | Verbrugge et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,568,930 B2 | 10/2013 | Halalay et al. |
| 8,642,201 B2 | 2/2014 | Cheng et al. |
| 8,658,295 B2 | 2/2014 | Cheng et al. |
| 8,663,840 B2 | 3/2014 | Nazri et al. |
| 8,679,680 B2 | 3/2014 | Vanimisetti et al. |
| 8,765,301 B2 | 7/2014 | Halalay et al. |
| 8,785,054 B2 | 7/2014 | Halalay et al. |
| 8,828,481 B2 | 9/2014 | Burton et al. |
| 8,835,056 B2 | 9/2014 | Xiao et al. |
| 8,835,058 B2 | 9/2014 | Kia et al. |
| 8,951,654 B2 | 2/2015 | Sachdev et al. |
| 8,993,646 B2 | 3/2015 | Huang |
| 9,012,075 B2 | 4/2015 | Verbrugge et al. |
| 9,023,520 B2 | 5/2015 | Halalay et al. |
| 9,028,565 B2 | 5/2015 | Huang |
| 9,034,519 B2 | 5/2015 | Xiao et al. |
| 9,059,451 B2 | 6/2015 | Xiao et al. |
| 9,077,038 B2 | 7/2015 | Halalay et al. |
| 9,093,705 B2 | 7/2015 | Xiao et al. |
| 9,138,932 B2 | 9/2015 | Huang |
| 9,142,830 B2 | 9/2015 | Xiao et al. |
| 9,153,819 B2 | 10/2015 | Huang et al. |
| 9,172,075 B2 | 10/2015 | Kia et al. |
| 9,178,208 B2 | 11/2015 | Park et al. |
| 9,281,515 B2 | 3/2016 | Nazri |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,362,560 B2 | 6/2016 | Nazri |
| 9,379,374 B2 | 6/2016 | Liu et al. |
| 9,397,338 B2 | 7/2016 | Park et al. |
| 9,437,863 B2 | 9/2016 | Xiao et al. |
| 9,553,303 B2 | 1/2017 | Park et al. |
| 9,583,757 B2 | 2/2017 | Park et al. |
| 9,583,767 B2 | 2/2017 | Verbrugge et al. |
| 9,786,906 B2 | 10/2017 | Yang et al. |
| 9,786,947 B2 | 10/2017 | Yushin et al. |
| 9,806,328 B2 | 10/2017 | Park et al. |
| 9,905,847 B2 | 2/2018 | Dadheech et al. |
| 9,923,189 B2 | 3/2018 | Xiao |
| 10,050,313 B2 | 8/2018 | Luski et al. |
| 10,141,569 B2 | 11/2018 | Verbrugge et al. |
| 10,164,245 B2 | 12/2018 | Huang |
| 10,211,452 B2 | 2/2019 | Jiang et al. |
| 10,326,136 B2 | 6/2019 | Xiao et al. |
| 10,396,360 B2 | 8/2019 | Xiao et al. |
| 10,424,784 B2 | 9/2019 | Yang et al. |
| 10,622,621 B2 | 4/2020 | Xiao et al. |
| 10,741,812 B2 | 8/2020 | Luski et al. |
| 11,316,142 B2 | 4/2022 | Jiang et al. |
| 2011/0143206 A1 | 6/2011 | Muthu et al. |
| 2011/0244136 A1 | 10/2011 | Ryabova |
| 2012/0100403 A1 | 4/2012 | Wang et al. |
| 2012/0102725 A1 | 5/2012 | Fuller et al. |
| 2012/0229096 A1 | 9/2012 | Nazri |
| 2012/0231321 A1 | 9/2012 | Huang et al. |
| 2012/0244427 A1 | 9/2012 | Hashimoto et al. |
| 2012/0308872 A1 | 12/2012 | Huang |
| 2012/0315384 A1 | 12/2012 | Abd Elhamid et al. |
| 2012/0328927 A1 | 12/2012 | Timmons et al. |
| 2013/0004857 A1 | 1/2013 | Kia et al. |
| 2013/0052509 A1 | 2/2013 | Halalay et al. |
| 2013/0099159 A1 | 4/2013 | Halalay et al. |
| 2013/0288106 A1 | 10/2013 | Chang et al. |
| 2013/0319599 A1 | 12/2013 | Huang |
| 2014/0127557 A1* | 5/2014 | Kasahara ............... H01M 4/134 429/163 |
| 2014/0205905 A1 | 7/2014 | Xiao et al. |
| 2014/0220233 A1 | 8/2014 | Huang et al. |
| 2014/0242452 A1 | 8/2014 | Pieczonka et al. |
| 2014/0272526 A1 | 9/2014 | Huang |
| 2015/0037651 A1 | 2/2015 | Huang |
| 2015/0056492 A1 | 2/2015 | Huang |
| 2015/0180023 A1 | 6/2015 | Xiao et al. |
| 2017/0098817 A1 | 4/2017 | Yu et al. |
| 2017/0155175 A1 | 6/2017 | Halalay et al. |
| 2017/0200943 A1 | 7/2017 | Kawakami |
| 2017/0271678 A1 | 9/2017 | Yang et al. |
| 2017/0324119 A1 | 11/2017 | Powell, Jr. et al. |
| 2017/0331115 A1 | 11/2017 | Saito et al. |
| 2018/0248718 A1 | 8/2018 | Zerbe et al. |
| 2018/0287129 A1 | 10/2018 | Park et al. |
| 2019/0190012 A1 | 6/2019 | Wu et al. |
| 2019/0245249 A1* | 8/2019 | Otohata ............ H01M 10/0585 |
| 2019/0372155 A1 | 12/2019 | Yersak et al. |
| 2020/0119339 A1 | 4/2020 | Halalay et al. |
| 2020/0185782 A1* | 6/2020 | Tanaka .................... H01M 4/70 |
| 2020/0220154 A1 | 7/2020 | Xiao et al. |
| 2020/0350558 A1 | 11/2020 | Jimenez et al. |
| 2021/0098774 A1 | 4/2021 | Zhang et al. |
| 2021/0151761 A1 | 5/2021 | Jimenez et al. |
| 2021/0408518 A1 | 12/2021 | Wang et al. |
| 2022/0037642 A1 | 2/2022 | Ellison et al. |
| 2022/0109136 A1 | 4/2022 | Ellison et al. |
| 2022/0173377 A1 | 6/2022 | Kong et al. |
| 2022/0238885 A1 | 7/2022 | Koestner et al. |

FOREIGN PATENT DOCUMENTS

| | | |
|---|---|---|
| CN | 104011914 A | 8/2014 |
| CN | 106129365 A | 11/2016 |
| CN | 106463267 A | 2/2017 |
| CN | 106816581 A | 6/2017 |
| CN | 106816583 A | 6/2017 |
| CN | 106816584 A | 6/2017 |
| CN | 106898769 A | 6/2017 |
| CN | 107293777 A | 10/2017 |
| CN | 107482166 A | 12/2017 |
| CN | 107623142 A | 1/2018 |
| CN | 108206263 A | 6/2018 |
| CN | 108963181 A | 12/2018 |
| CN | 109148796 A | 1/2019 |
| CN | 109494351 A | 3/2019 |
| CN | 109935758 A | 6/2019 |
| CN | 109935782 A | 6/2019 |
| CN | 110350151 A | 10/2019 |
| CN | 111095645 A | 5/2020 |
| CN | 111199833 A | 5/2020 |
| CN | 112531144 A | 3/2021 |
| CN | 114597346 A | 6/2022 |
| CN | 114597348 A | 6/2022 |
| DE | 102018114605 A1 | 12/2018 |
| DE | 102018132326 A1 | 6/2019 |
| DE | 102021114593 A1 | 6/2022 |
| DE | 102021114594 A1 | 6/2022 |
| JP | 2007005747 A | 1/2007 |
| JP | 2011003365 A | 1/2011 |

(56) References Cited

FOREIGN PATENT DOCUMENTS

| JP | 2016219343 A | 12/2016 |
| JP | 2018020298 A | 2/2018 |
| JP | 2019164932 A | 9/2019 |
| WO | 2013147006 | 12/2015 |

OTHER PUBLICATIONS

Oeffler, et al. "Secondary Lithium-Ion Battery Anodes: From First Commercial Batteries to Recent Research Activities", Johnson Matthey Technol. Rev., 2015, 59, (1), 34-44.

Wang et al., "Composite Titanate-Graphite Negative Electrode for Improved State-of-Charge Estimation of Lithium-Ion Batteries", J. Electrochem. Soc., 157, (2), A185-A189, 2010.

Li, Jin-Yi et al., "Research progress regarding Si-based anode materials towards practical application in high energy density Li-ion batteries." Materials Chemistry Frontiers, vol. 1, No. 9, pp. 1691-1708 (2017).

Anjan Banerjee et al.; "Increasing the Durability of Li-ion Batteries by Means of Manganese Ion Trapping Materials with Nitrogen Functionalities"; Journal of Power Sources 341 (2017); Dec. 10, 2016; pp. 457-465.

Anjan Banerjee et al.; "Improving Stability of Li-Ion Batteries by Means of Transition Metal Ions Trapping Separators"; Journal of the Electrochemical Society, 163 (6); Mar. 29, 2016; pp. A1083-A1094.

Anjan Banerjee et al.; "Multifunctional Manganese Ions Trapping and Hydrofluoric Acid Scavenging Separator for Lithium Ion Batteries Based on Poly (ethylene-alternate-maleic acid) Dilithium Salt"; Advanced Energy Materials, www.MaterialsViews.com; 2016; 9 pages.

Anjan Banerjee et al.; "Review-Multifunctional Materials for Enhanced Li-Ion Batteries Durability: A Brief Review of Practical Options"; Journal of the Electrochemical Society, 164 (1); Jan. 5, 2017; pp. A6315-A6323.

Anjan Banerjee et al.; "Reducing the High Temperature Performance Degradation in Li-Ion Batteries By Using Ion-Trapping Separators"; IMLB; 18th International Meeting on Lithium Batteries; Jun. 20, 2016; 3 pages.

Alexandratos, Spiro D et al., "Amination of Poly(vinylenzysl chloride) with N,N-Dimethylformamide, " Macromolecules, 36 (9), pp. 3436-3439; DOI: 10.1021/ma0215767 (Apr. 10, 2003).

Hahn, Stephen F., "An improved method for the miimide hydrogenation of butadiene and isoprene contianing polymers," Journal of Polymer rScience Part A: Polymer Chemistry, 30, (3) pp. 397-408; DOI: 10.1002/pola.1992.080300307 (Published Mar. 15, 1992) (Abstract Only).

Lloyd, W.G. et al., "Nucleophilic displacements upon poly(vinylbenzyl chloride)" Journal of Applied Polymer Science, 7 (6) pp. 2025-2033; DOI: 10.1002/app.1963.070070606 (Nov. 1963).

Tang, Yiming et al., "Preparation of Monodispersed Core-Shell Microspheres with Surface Antibacterial Property Employing N -(4-vinylbenzyl)- N,N -diethylamine Hydrochloride as Surfmer," International Journal of Polmyeric Materials, 65 (3) pp. 143-150; DOI: 10.1080/00914037.2015.1074913 (Published online: Sep. 18, 2015).

Arora, Pankaj et al., "Battery Separators," Chem. Rev. 2004, 104 (10) pp. 4419-4462; DOI: 10.1021/cr020738u (Published online: Oct. 13, 2004).

Banerjee, Anjan et al., "Acid-Scavenging Separators: A novel route for improving Li-ion batteries' durability", ACS Energy Lett, 2 (2017) pp. 2388-2393, DOI: 10.1021/acsenergylett.7b00763.

Shilina, Yulina et al., "LNMO-graphite cells performance enhancement by the use of acid scavenging separators," ChemElectroChem, 6(14), pp. 3690-3698; (Published Jun. 26, 2019) DOI: 10.1002/celc.201900907.

First Office Action for Chinese Patent Application No. 202011391714.1 dated Sep. 28, 2023, with correspondence from China Patent Agent (H.K.) Ltd. summarizing Office Action; 11 pages.

Koestner, Roland J. et al.; U.S. Appl. No. 17/159,978, filed Jan. 27, 2021; entitled "Carbon-Based Conductive Filler Precursor Dispersions for Battery Electrodes and Methods for Making and Use Thereof"; 61 pages.

Wang, Meixian et al.; U.S. Appl. No. 17/841,113, filed Jun. 15, 2022 entitled "Electrode Having an Alternating Layered Structure"; 45 pages.

Ellison, Nicole et al, U.S. Appl. No. 16/943,661, filed Jul. 30, 2020 entitled "Formulation and Fabrication of Thick Cathodes," 57 pages.

Wang, et al, U.S. Appl. No. 16/910,456, filed Jun. 24, 2020 entitled "Thick, Flexible Cathodes for Lithium-Ion Batteries," 21 pages.

Ellison et al, U.S. Appl. No. 17/060,606, filed Oct. 1, 2020 entitled "Electrode Assembly and Method of Making the Same," 32 pages.

First Office Action for Chinese Patent Application No. 202011387727.1 dated Oct. 11, 2023, with correspondence from Chinese Patent Agent (H.K.) Ltd. summarizing Office Action; 8 pages.

\* cited by examiner

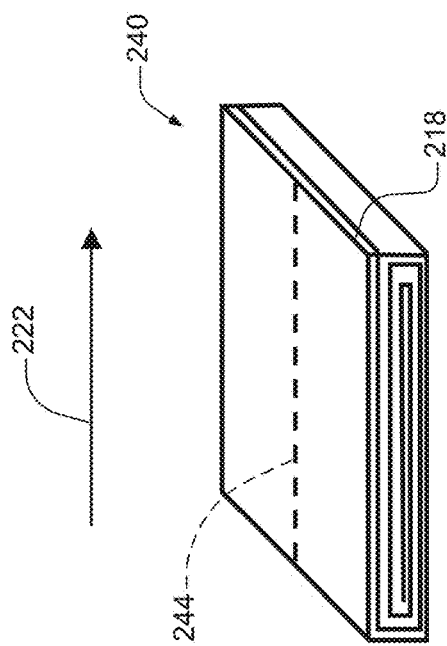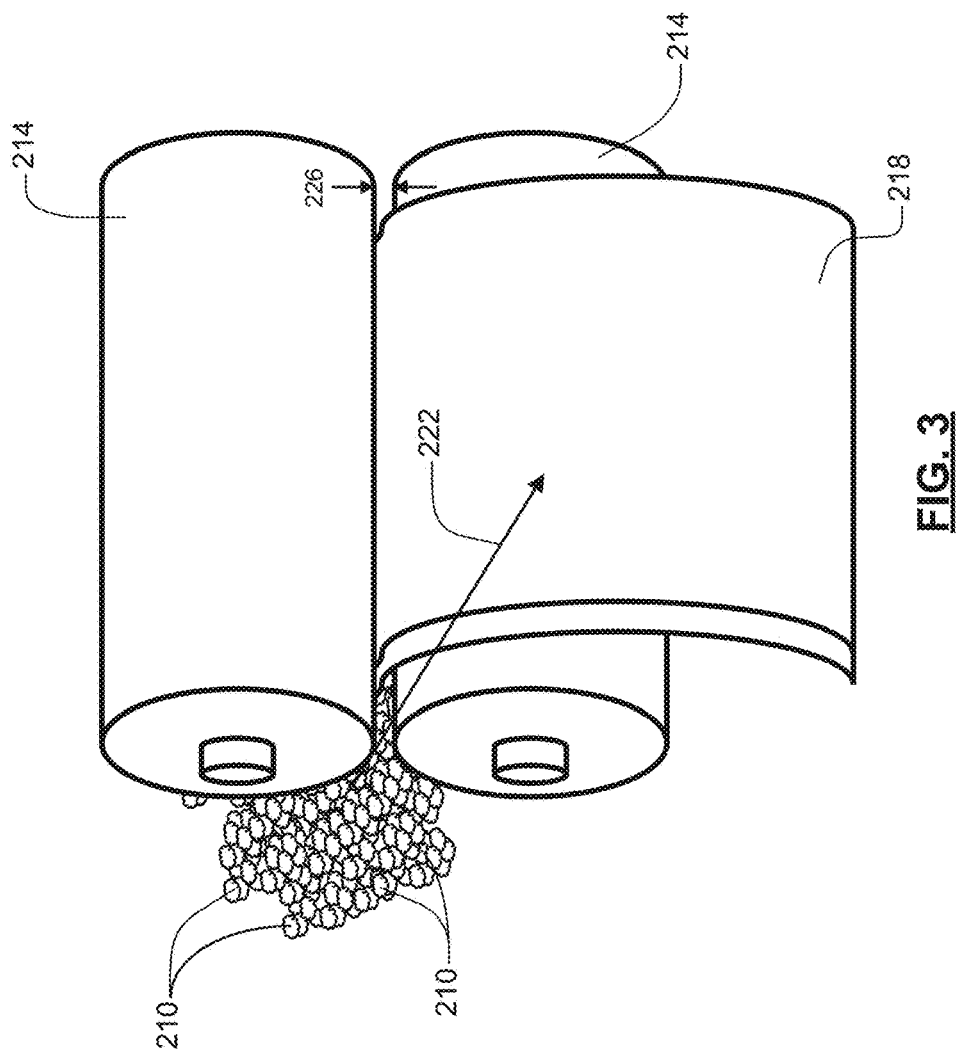

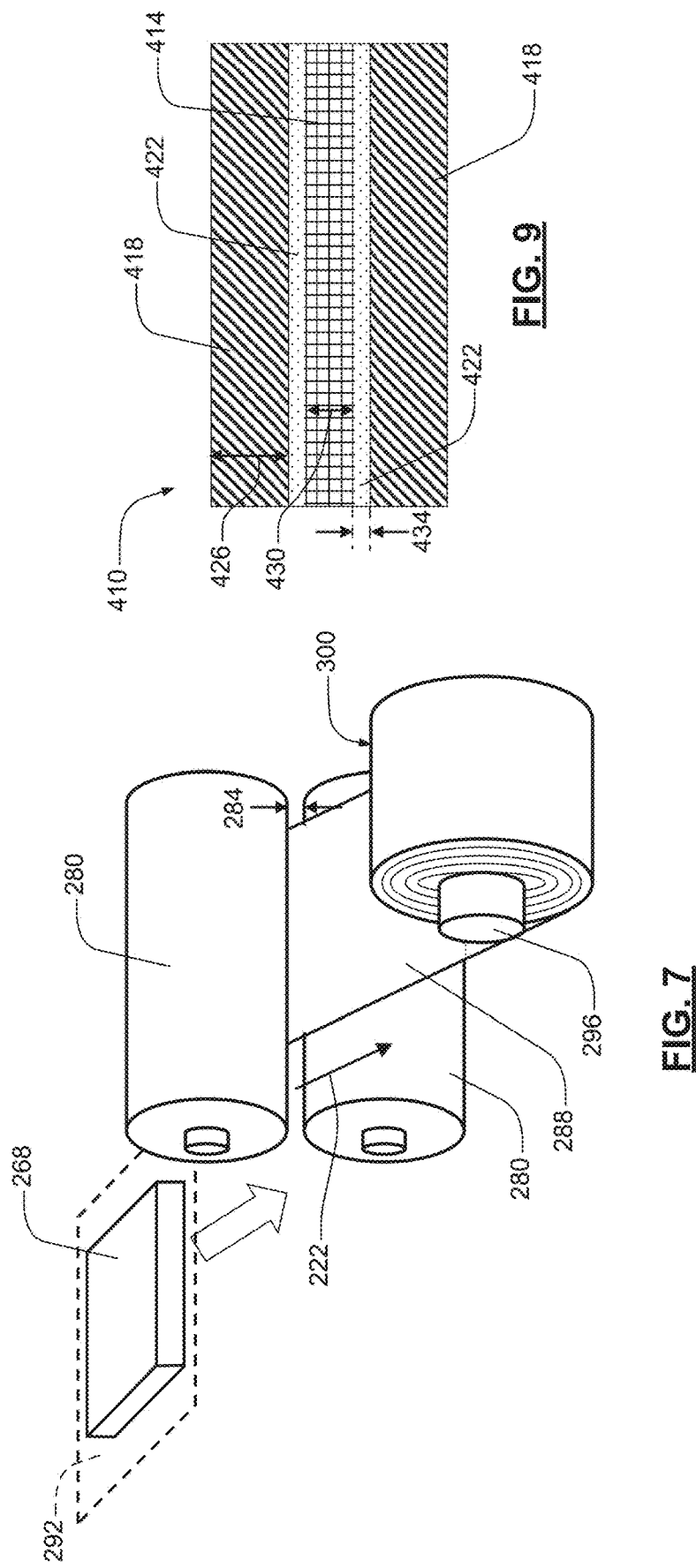

FABRICATION PROCESS TO MAKE ELECTRODES BY ROLLING

CROSS-REFERENCE TO RELATED APPLICATIONS

This application claims the benefit and priority of Chinese Patent Application No. 202011387727.1, filed Dec. 2, 2020. The entire disclosure of the above application is incorporated herein by reference.

INTRODUCTION

This section provides background information related to the present disclosure which is not necessarily prior art.

The present disclosure relates to a fabrication process to make electrodes by rolling, electrodes made by the fabrication process, and electrochemical cells including the electrodes High-energy density electrochemical cells, such as lithium-ion batteries can be used in a variety of consumer products and vehicles, such as battery or hybrid electric vehicles. Battery powered vehicles show promise as a transportation option as technical advances continue to be made in battery power and lifetimes.

SUMMARY

This section provides a general summary of the disclosure, and is not a comprehensive disclosure of its full scope or all of its features.

In various aspects, the present disclosure provides a method of manufacturing an electrode for an electrochemical cell. The method includes providing an admixture. The admixture includes an electroactive material, a binder, and a solvent. The method further includes rolling the admixture to form a sheet. The method further includes forming a multi-layer stack from the sheet. The method further includes forming an electrode film precursor by performing a plurality of sequential rollings. Each rolling includes rolling the multi-layer stack through a first gap defined in a direction transverse to a plane of the multi-layer stack. The plurality of sequential rollings includes a first rolling and a second rolling. In the first rolling, the multi-layer stack is in a first orientation with respect to a machine direction. In the second rolling, the multi-layer stack is in a second orientation with respect to the machine direction. The second orientation is different from the first orientation. The method further includes forming an electrode film by rolling the electrode film precursor through a second gap defined in the direction. The second gap is less than or equal to the first gap. The method further includes drying the electrode film to remove at least a portion of the solvent to form the electrode.

In one aspect, the second orientation is about 85-95° from the first orientation.

In one aspect, the electroactive material has a tap density of less than or equal to about 1.3 g/cm$^3$.

In one aspect, the plurality of sequential rollings includes 2-50 rollings.

In one aspect, the second gap is less than the first gap.

In one aspect, the second gap is 20 μm-2 mm.

In one aspect, the providing includes, forming a pre-admixture by admixing the electroactive material and a conductive filler. The providing further includes forming the admixture by lump-mixing the pre-admixture, the binder, and the solvent.

In one aspect, the providing includes forming the admixture by kneading the electroactive material, a conductive filler, the binder, and the solvent.

In one aspect, the method further includes coupling the electrode to a current collector after the drying.

In one aspect, wherein the coupling includes, disposing an electrically conductive glue between the electrode and the current collector. The coupling further includes hot laminating the electrode to the current collector.

In one aspect, the hot laminating includes passing the electrode and the current collector having the electrically conductive glue therebetween through a third gap defined in the direction. The third gap is greater than the second gap.

In one aspect, the coupling further includes pre-heating the electrode and the current collector prior to the hot laminating.

In one aspect, the current collector is a mesh current collector. The coupling includes pressing the electrode onto the mesh current collector.

In one aspect, the forming the electrode film includes applying the sheet to a film prior to the rolling.

In various aspects, the present disclosure provides an electrode for an electrochemical cell. The electrode includes an electroactive material, a binder, and a conductive filler. The electroactive material is present in an amount of 80-98% by weight. The electroactive material has a tap density of less than about 2 g/cm$^3$. The binder is present in an amount of about 0.5-10% by weight. The conductive filler is present in an amount of about 0.5-15% by weight. The electrode is configured to have a discharge capacity loading of about 0.5-50 mAh/cm$^2$ during cycling of an electrochemical cell including the electrode.

In one aspect, the electroactive material is a positive electroactive material. The positive electroactive material includes an olivine compound In one aspect, the electroactive material includes a lithium manganese iron phosphate.

In various aspects, the present disclosure provides an electrode assembly. The electrode assembly includes an active material layer, a current collector, and an electrically-conductive glue layer. The active material layer includes the electrode. The electrically-conductive glue layer is between the electrode and the current collector.

In one aspect, the electrically-conductive glue layer includes a polymer and a conductive filler. A weight ratio of the conductive filler to the polymer is in a range of about 0.1-50%.

In various aspects, the present disclosure provides an electrode assembly for an electrochemical cell. The electrode assembly includes two active material layers, a current collector, and two conductive glue layers. Each of the two active material layers defines a thickness of about 20 μm-2 mm. Each of the two active material layers defines a porosity of about 25-65%. Each of the two active material layers includes a lithium manganese iron phosphate, a binder, and a conductive filler. The lithium manganese iron phosphate is present in an amount of about 80-98% by weight. The binder is present in an amount of about 0.5-10% by weight. The conductive filler is present in an amount of about 0.5-15% by weight. The current collector is between the two active material layers. Each of the conductive glue layers is between the current collector and a respective one of the two active material layers. Each active material layer is configured to have a discharge capacity loading of greater than or equal to about 4 mAh/cm$^2$ during cycling of an electrochemical cell including the electrode assembly.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3 is a perspective illustration of a method of forming a sheet according to various aspects of the present disclosure;

FIG. 4 is a perspective illustration of a stack according to various aspects of the present disclosure;

FIG. 7 is a perspective illustration of a method of forming an electrode film according to various aspects of the present disclosure;

FIG. 9 is a sectional view of the electrode assembly formed in the method of FIG. 8;

Corresponding reference numerals indicate corresponding parts throughout the several views of the drawings.

DETAILED DESCRIPTION

Figure 1:
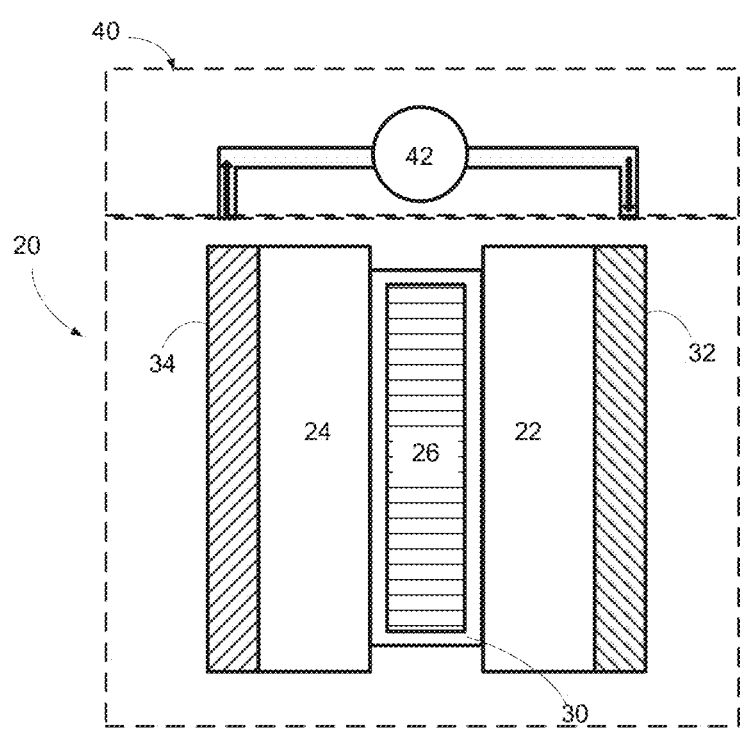
FIG. 1 is a schematic illustration of an electrochemical battery cell for cycling lithium ions.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to rechargeable lithium-ion batteries, which may be used in vehicle applications. However, the present technology may also be used in other electrochemical devices that cycle lithium ions, such as handheld electronic devices or energy storage systems (ESS).

General Electrochemical Cell Function, Structure, and Composition

An electrochemical cell generally includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

An exemplary schematic illustration of a lithium-ion battery 20 is shown in FIG. 1. The lithium-ion battery 20 includes a negative electrode 22, a positive electrode 24, and a porous separator 26 (e.g., a microporous or nanoporous polymeric separator) disposed between the negative and positive electrodes 22, 24. An electrolyte 30 is disposed between the negative and positive electrodes 22, 24 and in pores of the porous separator 26. The electrolyte 30 may also be present in the negative electrode 22 and positive electrode 24, such as in pores.

A negative electrode current collector 32 may be positioned at or near the negative electrode 22. A positive electrode current collector 34 may be positioned at or near the positive electrode 24. While not shown, the negative electrode current collector 32 and the positive electrode current collector 34 may be coated on one or both sides. In certain aspects, the current collectors may be coated with an electroactive material/electrode layer on both sides. The negative electrode current collector 32 and positive electrode current collector 34 respectively collect and move free electrons to and from an external circuit 40. The interruptible external circuit 40 includes a load device 42 connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless known to those of skill in the art. For instance, the lithium-ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution that includes one or more lithium salts dissolved in an organic solvent or a mixture of organic solvents. Numerous non-aqueous liquid electrolyte 30 solutions may be employed in the lithium-ion battery 20. In certain variations, the electrolyte 30 may include an aqueous solvent (i.e., a water-based solvent) or a hybrid solvent (e.g., an organic solvent including at least 1% water by weight).

Appropriate lithium salts generally have inert anions. Non-limiting examples of lithium salts that may be dissolved in an organic solvent to form the non-aqueous liquid electrolyte solution include lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium difluorooxalatoborate ($LiBF_2(C_2O_4)$) (LiODFB), lithium tetraphenylborate ($LiB(C_6H_5)_4$); lithium bis-(oxalate)borate ($LiB(C_2O_4)_2$) (LiBOB); lithium tetrafluorooxalatophosphate ($LiPF_4(C_2O_4)$) (LiFOP), lithium nitrate ($LiNO_3$), lithium hexafluoroarsenate ($LiAsF_6$); lithium trifluoromethanesulfonate ($LiCF_3SO_3$); lithium bis (trifluoromethanesulfonimide) (LITFSI) ($LiN(CF_3SO_2)_2$); lithium fluorosulfonylimide ($LiN(FSO_2)_2$) (LIFSI); and combinations thereof. In certain variations, the electrolyte 30 may include a 1.2 M concentration of the lithium salts.

These lithium salts may be dissolved in a variety of organic solvents, such as organic ethers or organic carbonates, by way of example. Organic ethers may include dimethyl ether, glyme (glycol dimethyl ether or dimethoxyethane (DME, e.g., 1,2-dimethoxyethane)), diglyme (diethylene glycol dimethyl ether or bis(2-methoxyethyl) ether), triglyme (tri(ethylene glycol) dimethyl ether), additional chain structure ethers, such as 1-2-diethoxyethane, ethoxymethoxyethane, 1,3-dimethoxypropane (DMP), cyclic ethers, such as tetrahydrofuran, 2-methyltetrahydrofuran, and combinations thereof. In certain variations, the organic ether compound is selected from the group consisting of: tetrahydrofuran, 2-methyl tetrahydrofuran, dioxolane, dimethoxy ethane (DME), diglyme (diethylene glycol dimethyl ether), triglyme (tri(ethylene glycol) dimethyl ether), 1,3-dimethoxypropane (DMP), and combinations thereof. Carbonate-based solvents may include various alkyl carbonates, such as cyclic carbonates (e.g., ethylene carbonate (EC), propylene carbonate (PC), butylene carbonate) and acyclic carbonates (e.g., dimethyl carbonate (DMC), diethyl carbonate (DEC), ethyl methyl carbonate (EMC)). Ether-based solvents include cyclic ethers (e.g., tetrahydrofuran, 2-methyltetrahydrofuran, 1,3-dioxolane) and chain structure ethers (e.g., 1,2-dimethoxyethane, 1-2-diethoxyethane, ethoxymethoxyethane).

In various embodiments, appropriate solvents in addition to those described above may be selected from propylene carbonate, dimethyl carbonate, diethyl carbonate, methyl ethyl carbonate, γ-butyrolactone, dimethyl sulfoxide, acetonitrile, nitromethane and mixtures thereof.

Where the electrolyte is a solid-state electrolyte, it may include a composition selected from the group consisting of: $LiTi_2(PO_4)_3$, $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $Li_2S\text{—}P_2S_5$, $Li_6PS_5Cl$, $Li_6PS_5Br$, $Li_6PS_5I$, $Li_3OCl$, $Li_{2.99} Ba_{0.005}ClO$, or any combination thereof.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from CELGARD LLC.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, or a combination thereof.

Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various commercially available polymers and commercial products for forming the separator 26 are contemplated, as well as the many manufacturing methods that may be employed to produce such a microporous polymer separator 26.

Solid-State Electrolyte

In various aspects, the porous separator 26 and the electrolyte 30 may be replaced with a solid-state electrolyte (SSE) that functions as both an electrolyte and a separator. The SSE may be disposed between a positive electrode and a negative electrode. The SSE facilitates transfer of lithium ions, while mechanically separating and providing electrical insulation between the negative and positive electrodes 22, 24. By way of non-limiting example, SSEs may include $LiTi_2(PO_4)_3$, $Li_{1.3}Al_{0.3}Ti_{1.7}(PO_4)_3$ (LATP), $LiGe_2(PO_4)_3$, $Li_7La_3Zr_2O_{12}$, $Li_3xLa_{2/3}\text{-}xTiO_3$, $Li_3PO_4$, $Li_3N$, $Li_4GeS_4$, $Li_{10}GeP_2S_{12}$, $Li_2S\text{—}P_2S_5$, $Li_6PS_5Cl$, $Li_6PS_5Br$, $Li_6PS_5I$, $Li_3OCl$, $Li_{2.99} Ba_{0.005}ClO$, or combinations thereof.

Current Collectors

The negative and positive electrodes 22, 24 are generally associated with the respective negative and positive electrode current collectors 32, 34 to facilitate the flow of electrons between the electrode and the external circuit 40. The current collectors 32, 34 are electrically conductive and can include metal, such as a metal foil, a metal grid or screen, or expanded metal. Expanded metal current collectors refer to metal grids with a greater thickness such that a greater amount of electrode material is placed within the metal grid. By way of non-limiting example, electrically-conductive materials include copper, nickel, aluminum, stainless steel, titanium, alloys thereof, or combinations thereof.

The positive electrode current collector 34 may be formed from aluminum or any other appropriate electrically-conductive material known to those of skill in the art. The negative electrode current collector 32 may be formed from copper or any other appropriate electrically-conductive material known to those of skill in the art. Negative electrode current collectors do not typically include aluminum because aluminum reacts with lithium, thereby causing large volume expansion and contraction. The drastic volume changes may lead to fracture and/or pulverization of the current collector.

Positive & Negative Electrodes

The positive electrode 24 may be formed from or include a lithium-based active material that can undergo lithium intercalation and deintercalation, alloying and dealloying, or plating and stripping, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. However, in certain variations, the positive electrode 24 is substantially free of select metal cations, such as nickel (Ni) and cobalt (Co).

Two exemplary common classes of electroactive materials that can be used to form the positive electrode 24 are lithium transition metal oxides with layered structures and lithium transition metal oxides with spinel phase. For example, in certain instances, the positive electrode 24 may include a spinel-type transition metal oxide, like lithium manganese oxide ($Li_{(1+x)}Mn_{(2-x)}O_4$), where x is typically <0.15, including $LiMn_2O_4$ (LMO) and lithium manganese nickel oxide $LiMn_{1.5}Ni_{0.5}O_4$ (LMNO). In other instances, the positive electrode 24 may include layered materials like lithium cobalt oxide ($LiCoO_2$), lithium nickel oxide ($LiNiO_2$), a lithium nickel manganese cobalt oxide ($LiNi_xMn_yCo_z)O_2$, where $0 \leq x \leq 1$, $0 \leq y \leq 1$, $0 \leq z \leq 1$, and $x+y+z=1$) (e.g., $LiNi_{0.6}Mn_{0.2}Co_{0.2}O_2$, $LiNi_{0.7}Mn_{0.2}Co_{0.1}O_2$, $LiNi_{0.8}Mn_{0.1}Co_{0.1}O_2$, and/or $LiMn_{0.33}Ni_{0.33}Co_{0.33}O_2$), a lithium nickel cobalt metal oxide ($LiNi_{(1-x-y)}Co_xM_yO_2$), where $0<x<1$, $0<y<1$ and M may be Al, Mg, Mn, or the like. Other known lithium-transition metal compounds such as lithium iron phosphate ($LiFePO_4$), lithium iron fluorophosphate ($Li_2FePO_4F$), or lithium manganese iron phosphate (e.g., $LiMnFePO_4$) can also be used. In certain aspects, the positive electrode 24 may include an electroactive material that includes manganese, such as lithium manganese oxide ($Li_{(1+x)}Mn_{(2-x)}O_4$), and/or a mixed lithium manganese nickel oxide ($LiMn_{(2-x)}Ni_xO_4$), where $0 \le x \le 1$. In a lithium-sulfur battery, positive electrodes may have elemental sulfur as the active material or a sulfur-containing active material.

The positive electroactive materials may be powder compositions. The positive electroactive materials may be intermingled with an optional electrically-conductive material (e.g., electrically-conductive particles) and a polymeric binder. The binder may both hold together the positive electroactive material and provide ionic conductivity to the positive electrode 24.

The negative electrode 22 may include a negative electroactive material as a lithium host material capable of functioning as a negative terminal of the lithium-ion battery 20. Common negative electroactive materials include lithium insertion materials or alloy host materials. Such materials can include carbon-based materials, such as lithium-graphite intercalation compounds, lithium-silicon compounds, lithium-tin alloys, or lithium titanate $Li_{4+x}Ti_5O_{12}$, where $0 \le x \le 3$, such as $Li_4Ti_5O_{12}$ (LTO).

In certain aspects, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically-conductive material, as well as one or more polymeric binder materials to structurally hold the lithium material together.

Some electroactive materials, such as lithium manganese iron phosphates (e.g., $LiMnFePO_4$) (LMFPs), are capable of high energy density and long lives. However, these materials may have properties, such as large specific surface area, high porosity, and low tap density, that present certain challenges. For example, low-tap-density materials may be difficult to incorporate into wet coating processes because particles of the electroactive material tend to spread out from one another, resulting in a low energy density. Additionally, large-surface-area and/or low-tap-density materials, such as LMFPs, may absorb a large amount of solvent, resulting in a non-flowable, low-solid-content slurry. Moreover, electrodes including these materials that are fabricated in wet coating processes may be susceptible to cracking after drying.

Method of Fabricating an Electrode

In various aspects, the present disclosure provides a method of fabricating an electrode. The method generally includes providing an admixture including an electroactive material, a binder, and a solvent. In certain aspects, the electroactive material has a tap density of less than about 2 g/cm³, optionally less than about 1.3 g/cm³, or optionally less than about 1 g/cm³. The method further includes rolling the admixture to form a sheet and forming a multi-layer stack from the sheet. The method further includes forming an electrode film precursor by rolling the stack through a first gap. The rolling is performed at least twice, with the stack being in a first orientation with respect to a machine direction during a first rolling and a second orientation different from the first orientation during a second rolling. The method further includes forming an electrode film by rolling the electrode film precursor through a second gap less than or equal to the first gap. The method further includes drying the electrode film to remove at least a portion of the solvent. In certain aspects, the method may be considered to be a "rolling process."

Figure 11:
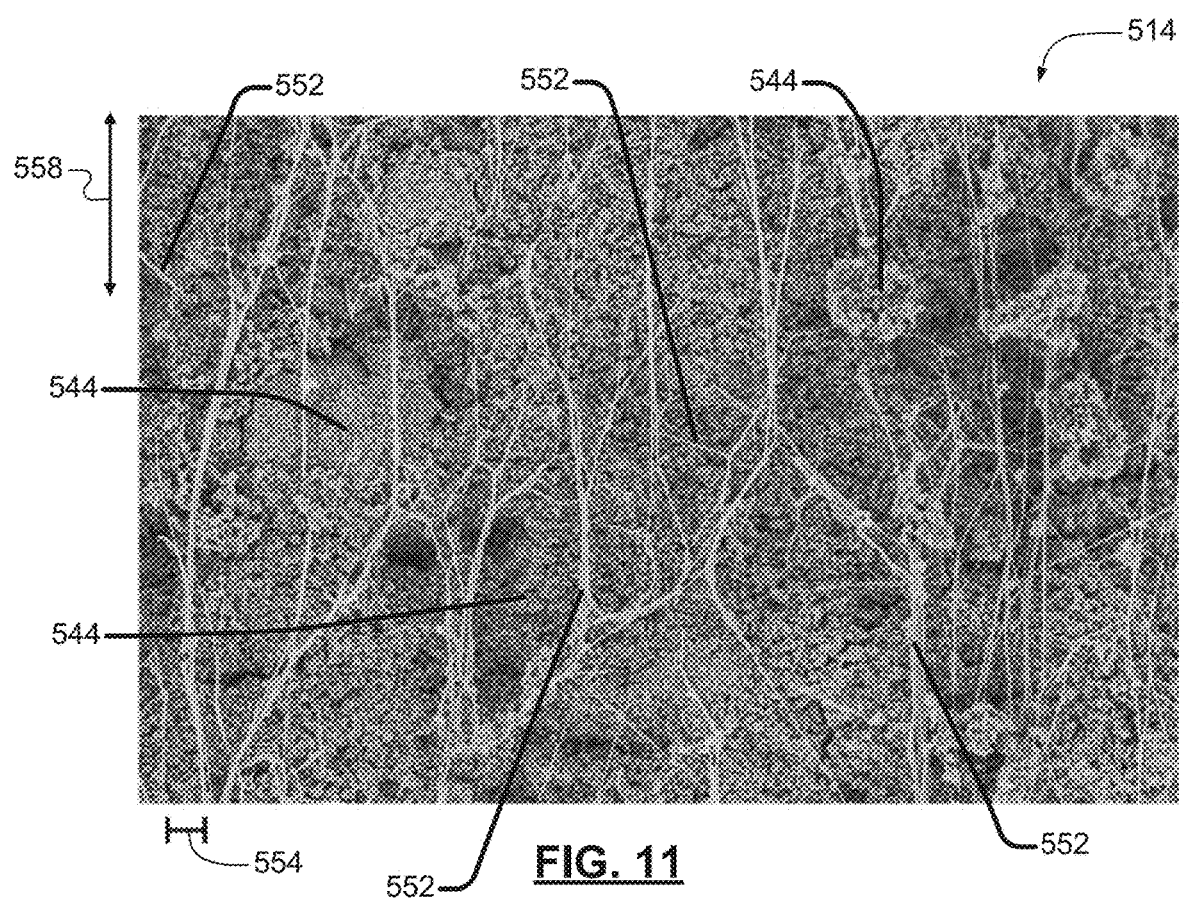
FIG. 11 is an SEM image of an electrode according to various aspects of the present disclosure.

The method of fabrication may promote the formation of a three-dimensional (3D) binder bonding network (see, e.g., FIG. 11 and accompanying discussion). The 3D binder bonding network may increase contact between electroactive particles and facilitate formation of a lower porosity electrode. The resulting electrode may have a higher energy density and active material loading than that of an electrode including similar materials that is formed by a wet coating process. In certain aspects, the electrode is configured to have a discharge capacity loading of greater than or equal to about 4 mAh/cm² during cycling of an electrochemical cell including the electrode. The electrode may be referred to as a "thick electrode."

Figure 2:
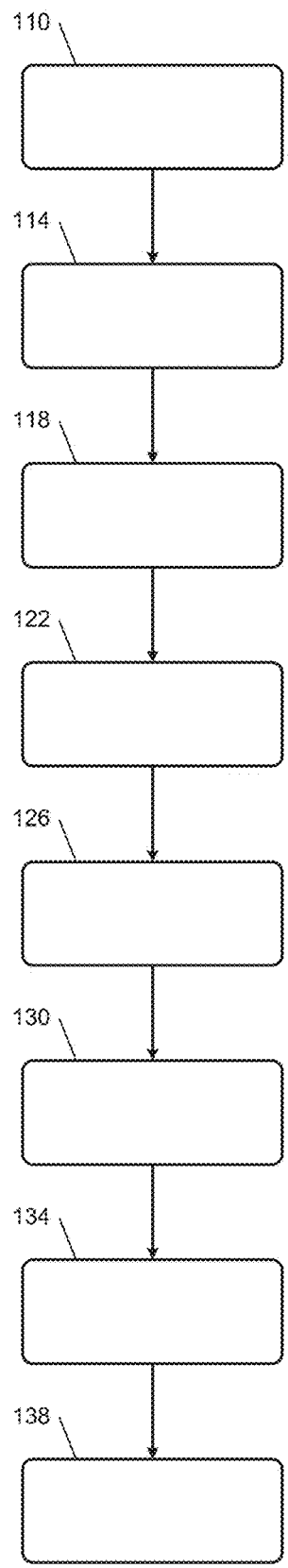
FIG. 2 is a flowchart depicting a method of fabricating an electrode by a rolling process according to various aspects of the present disclosure.

With reference to FIG. 2, a method of fabricating an electrode according to various aspects of the present disclosure is provided. The method generally includes providing an admixture at 110, forming a sheet at 114, forming a multi-layer stack at 118, forming an electrode film precursor at 122, forming an electrode film at 126, and forming an electrode at 130. In certain aspects, the method further includes fabricating an electrode assembly at 134. In certain aspects, the method further includes assembling an electrochemical cell at 138. In certain other aspects, a method according to various aspects of the present disclosure may only include a portion of the steps, such as 110, 114, 126, 130, and 134. Each of the steps is described in further detail below.

Providing an Admixture

At 110, the method includes providing an admixture. The admixture generally includes an electroactive material, a binder, and a solvent. In certain aspects, the admixture further includes a conductive filler. The admixture may include 80-98% electroactive material, 0.5-15% conductive filler, and 0.5-10% binder by dry weight.

In various aspects, providing the admixture includes forming the admixture. The admixture may be formed in a single-step process or a two-step process. The single-step process for forming an admixture may include kneading the electroactive material, the conductive filler, and the binder together with the solvent. The single-step process may be performed using a commercial kneading machine.

The two-step process for forming the admixture generally includes forming a pre-admixture by admixing the electroactive material and the conductive filler, then forming the admixture by lump-mixing the pre-admixture, the binder, and the solvent. The two-step process may be performed using commercial equipment, such as a planetary mixer, a bowl mixer, an extruder, or any combination thereof.

Tap density (also referred to as "tapped density") is an increased bulk density attained after mechanically tapping a vessel, such as a graduated cylinder, containing a powder sample of the electroactive material after a defined period of time. In certain aspects, the electroactive material has a tap density of less than about 3 g/cm$^3$ (e.g., less than or equal to about 2.8 g/cm$^3$, less than or equal to about 2.5 g/cm$^3$, less than or equal to about 2 g/cm$^3$, less than or equal to about 1.5 g/cm$^3$, less than or equal to about 1.4 g/cm$^3$, less than or equal to about 1.3 g/cm$^3$, less than or equal to about 1.2 g/cm$^3$, less than or equal to about 1.1 g/cm$^3$, less than or equal to about 1 g/cm$^3$, less than or equal to about 0.9 g/cm$^3$, less than or equal to about 0.8 g/cm$^3$, less than or equal to about 0.7 g/cm$^3$, less than or equal to about 0.6 g/cm$^3$, less than or equal to about 0.5 g/cm$^3$).

The electroactive material includes a positive electroactive material or a negative electroactive material. In certain aspects, the positive electroactive material includes an olivine compound, a rock salt layered oxide, a spinel, a tavorite, a borate, a silicate, an organic compound, other types of positive electrode materials (such as those described in the discussion accompanying FIG. 1), or any combination thereof. The olivine compound may include LiV$_2$(PO$_4$)$_3$, LiFePO$_4$ (LFP), LiCoPO$_4$, and/or a lithium manganese iron phosphate (LMFP), by way of example. LMFPs may include LiMnFePO$_4$ and/or LiMn$_x$Fe$_{1-x}$PO$_4$, where 0≤x≤1, by way of example. Examples of LiMn$_x$Fe$_{1-x}$PO$_4$, where 0≤x≤1, include LiMn$_{0.7}$Fe$_{0.3}$PO$_4$, LiMn$_{0.6}$Fe$_{0.4}$PO$_4$, LiMn$_{0.8}$Fe$_{0.2}$PO$_4$, and LiMn$_{0.75}$Fe$_{0.25}$PO$_4$, by way of example. The rock salt layered oxide may include LiNi$_x$Mn$_y$Co$_{1-x-y}$O$_2$, LiNi$_x$Mn$_{1-x}$O$_2$, Li$_{1+x}$MO$_2$, (e.g., LiCoO$_2$, LiNiO$_2$, LiMnO$_2$, and/or LiNi$_{0.5}$Mn$_{0.5}$O$_2$), a lithium nickel manganese cobalt oxide (NMC) (e.g., NMC 111, NMC 523, NMC 622, NMC 721, and/or NMC 811), and/or a lithium nickel cobalt aluminum oxide (NCA)), by way of example. The spinel may include LiMn$_2$O$_4$ and/or LiNi$_{0.5}$Mn$_{1.5}$O$_4$, by way of example. The tavorite compound may include LiVPO$_4$F, by way of example. The borate compound may include LiFeBO$_3$, LiCoBO$_3$, and/or LiMnBO$_3$, by way of example. The silicate compound may include Li$_2$FeSiO$_4$, Li$_2$MnSiO$_4$, and/or LiMnSiO$_4$F, by way of example. The organic compound may include dilithium(2,5-dilithiooxy)terephthalate and/or polyimide, by way of example. An example of another type of positive electroactive material is a sulfur-containing material, such as sulfur. In one example, the positive electroactive material includes one or more olivine compounds and has a tap density of less than about 2 g/cm$^3$, optionally less than about 1.3 g/cm$^3$, or optionally less than about 1 g/cm$^3$.

Some positive electroactive materials, such as olivine compounds, rock salt layered oxides, and/or spinels, may be a coated and/or doped. Dopants can include magnesium (Mg), aluminum (Al), yttrium (Y), scandium (Sc), and the like. For example, the positive electroactive material may include one or more of LiMn$_{0.7}$Mg$_{0.05}$Fe$_{0.25}$PO$_4$, LiMn$_{0.75}$Al$_{0.05}$Fe$_{0.2}$PO$_4$, LiMn$_{0.75}$Al$_{0.03}$Fe$_{0.22}$PO$_4$, LiMn$_{0.75}$Al$_{0.03}$Fe$_{0.22}$ PO$_4$, LiMn$_{0.7}$Y$_{0.02}$Fe$_{0.28}$PO$_4$, LiMn$_{0.7}$Mg$_{0.02}$Al$_{0.03}$Fe$_{0.25}$PO$_4$, and the like. In certain aspects, a positive electroactive material including an LMFP compound may be doped with about 10% by weight of one or more dopants.

In certain aspects, the negative electroactive material includes a carbonaceous material, a tin-containing material, a lithium titanium oxide, a metal oxide, a metal sulfide, a silicon-containing material, or any combination thereof. The carbonaceous material may include carbon nanotubes, graphite, and/or graphene, by way of example. The tin-containing material may include tin and/or a tin alloy, by way of example. The lithium titanium oxide may include Li$_4$Ti$_5$O$_{12}$, by way of example. The metal oxide may include V$_2$O$_5$, SnO$_2$ and/or Co$_3$O$_4$, by way of example. The metal sulfide may include FeS, by way of example. The silicon-containing material may include silicon, a silicon alloy and/or silicon graphite.

In certain aspects, the conductive filler includes carbon-based materials, a metal (e.g., metal wire), a metal oxide, and/or a conductive polymer. Carbon-based materials may include, by way of example, graphite, a carbon black (e.g., KETJEN black, DENKA black, SUPER-P (SP), and/or acetylene black), and/or carbon fibers (e.g., vapor grown carbon fibers (VGCF)). Conductive metal particles may include nickel, gold, silver, copper, and/or aluminum. Examples of a conductive polymer include polyaniline, polythiophene, polyacetylene, and/or polypyrrole. An example of a metal oxide is RuO$_2$. In certain aspects, mixtures of electrically-conductive materials may be used.

In certain aspects, the binder includes a polymer that is configured to undergo fibrillation within a temperature range or upon being subjected to a sheer force. The binder may include polytetrafluoroethylene (PTFE), polyacrylic acid (PAA), styrene butadiene rubber (SBR), ethylene tetrafluoroethylene (ETFE), ethylene chlorotrifluoroethylene (ECTFEC), polyvinyl fluoride (PVF), perfluoroalkoxy alkanes "PFA), fluorinated ethylene propylene (FEP), a polymer of tetrafluoroethylene, hexafluoropropylene and vinylidene fluoride (THV), polychlorotrifluoroethylene (PCTFE), or any combination thereof. In certain aspects, the binder includes an aqueous-based polymer dispersion, such as an aqueous-based PTFE dispersion. In certain aspects, the binder includes an organic-based polymer latex. In certain aspects, the binder is NMP based.

In certain aspects, the solvent includes an organic solvent. The organic solvent may include an alcohol (e.g., isopropanol) and/or a ketone, by way of example.

Forming and Sheet

At 114, the method includes forming a sheet from the admixture. In certain aspects, step 114 may be referred to as a "pre-rolling step." With reference to FIG. 3, an illustration of the method of forming a sheet according to various aspects of the present disclosure is provided.

The method includes rolling the admixture, which may be in a form of a plurality of lumps 210, through a pair of first rollers 214 to form a sheet 218. The first rollers 214 discharge the sheet 218 in a machine direction (MD) 222. In certain aspects, the first rollers 214 define a pre-rolling gap 226 therebetween. The pre-rolling gap 226 is defined in a direction transverse to a plane of the sheet 218. The pre-rolling gap 226 may be in a range of 150 μm-5 mm (e.g., 150-250 μm, 250-500 μm, 500 μm-1 mm, 500-750 μm, 750 μm-1 mm, 1-3 mm, 1-2 mm, 2-3 mm, 3-5 mm, 3-4 mm, or 4-5 mm).

Forming a Stack

Returning to FIG. 2, at 118, the method includes forming a stack from the sheet.

Referring to FIG. 4, the sheet 218 is shaped into a multilayer stack 240. The sheet 218 may be shaped into the stack 240 by winding, forming a Z-shape, or otherwise combining. In certain aspects, the stack 240 is formed as the sheet is discharged from the first rollers 214. The stack 240 defines an axis 244. In certain aspects, the axis 244 may be substantially parallel to the machine direction 222 (FIG. 3). The stack 240 may include about 2-100 layers (e.g., 2-10, 10-50, 10-25, 10-15, 15-25, 25-50, 50-100, 50-75, 75-100, 100-200, 100-150, or 150-200).

Forming an Electrode Film Precursor

Returning to FIG. 2, at 122, the method includes forming an electrode film precursor from the stack. In certain aspects, forming the electrode film precursor may be referred to as a "main rolling process." Forming the electrode film precursor generally includes performing a plurality of sequential rolling steps (or "rollings") and changing an orientation of the stack between at least some of the rolling steps. The stack is rolled in at least two different orientations. Accordingly, the plurality of rolling steps includes at least a first rolling step (FIG. 5) and a second rolling step (FIG. 6).

Figure 5:
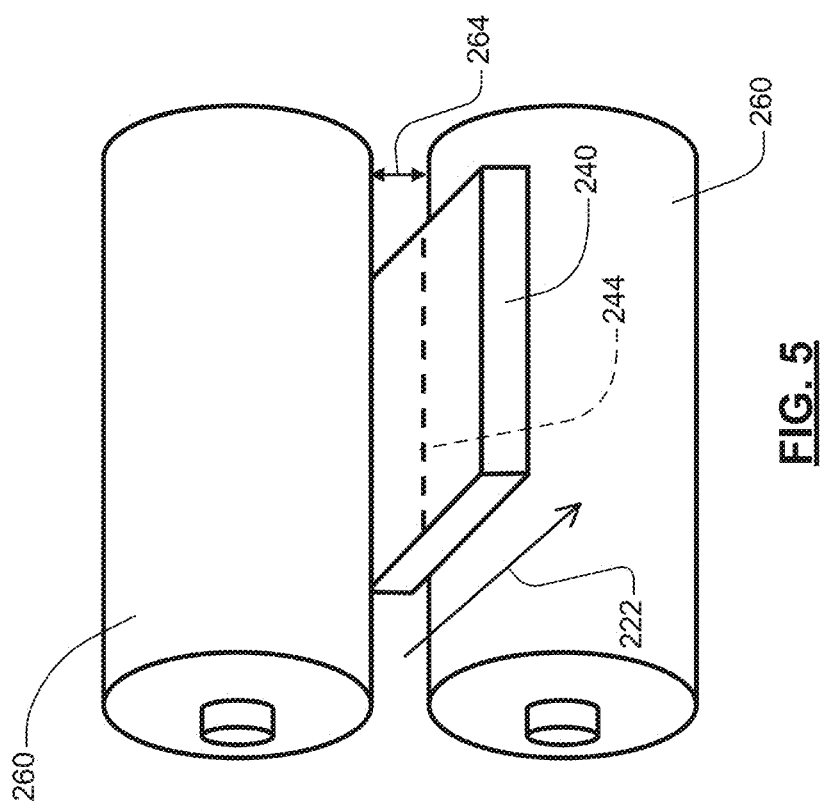
FIG. 5 is a perspective illustration of a step of a method of forming an electrode film precursor according to various aspects of the present disclosure.

With reference to FIG. 5, a first rolling step according to various aspects of the present disclosure is provided. In the first rolling step, the stack 240 is rolled through a pair of second rollers 260. The pair of second rollers 260 define a first or main rolling gap 264 therebetween. The first gap 264 is defined in a direction transverse to a plane of the stack 240 (i.e., parallel to the pre-rolling gap 226). The first gap 264 may be 150 μm-5 mm (e.g., 150-250 μm, 250-500 μm, 500 μm-1 mm, 500-750 μm, 750 μm-1 mm, 1-3 mm, 1-2 mm, 2-3 mm, 3-5 mm, 3-4 mm, or 4-5 mm). Binder distribution may become more uniform with a larger first gap 264. In certain aspects, the first gap 264 is less than or equal to the pre-rolling gap 226 (FIG. 3). For example, the pre-rolling gap 226 and the first gap 264 may be the same. In certain aspects, each of the rolling steps in the main rolling process is performed at the first gap 264. In certain aspects, the same rolling machine and rollers may be used to form the sheet 218 (FIG. 3) and the electrode film precursor 268.

The stack 240 is disposed at a first orientation with respect to the machine direction 222. In one example, as shown, the first orientation is substantially perpendicular to the machine direction 222 (i.e., a tensile direction). In another example, the first orientation is substantially parallel to the machine direction 222.

Figure 6:
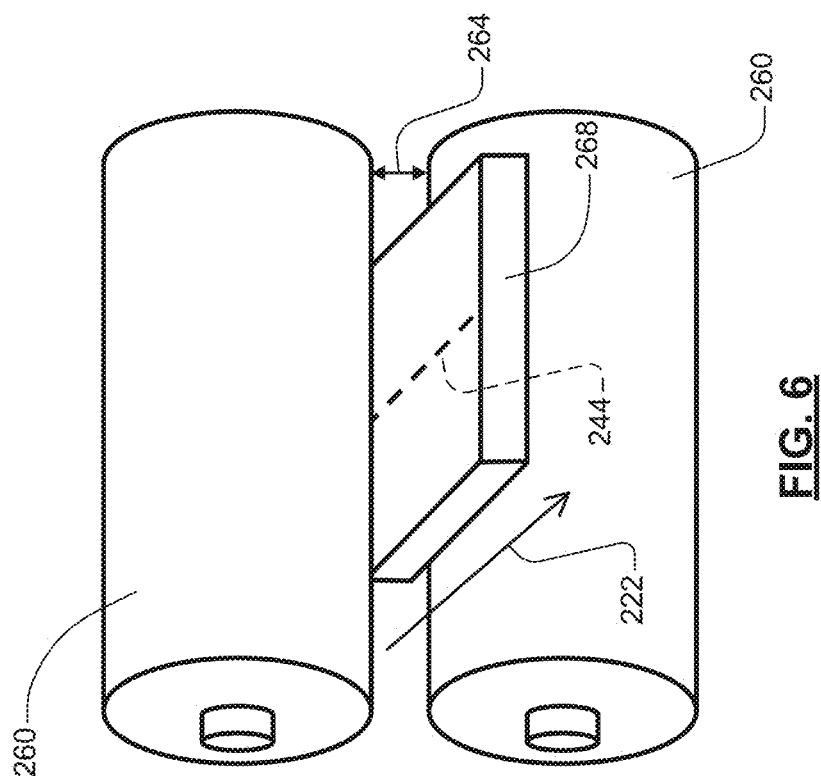
FIG. 6 is a perspective illustration of another step of a method of forming an electrode film precursor according to various aspects of the present disclosure.

Referring to FIG. 6, a second rolling step according to various aspects of the present disclosure is provided. The second rolling step includes rolling the stack 240 (FIG. 5) through the pair of second rollers 260 at a second orientation with respect to the machine direction 222 to form an electrode film precursor 268. The second orientation is different from the first orientation. In one example, as shown, the second orientation is substantially parallel to the machine direction 222. In another example, the second orientation is substantially perpendicular to the machine direction 222.

In certain other aspects, the first and second orientations may differ from machine and tensile directions. The second orientation may generally be about 45-135° (e.g., 45-90°, 45-55°, 55-65°, 65-75°, 70-110°, 75-85°, 80-100°, 85-95°, 90-135°, 95-105°, 105-115°, 115-125°, or 125-135°) from the first orientation. In certain aspects, the second orientation is 80-100° from the first orientation. In one example, such as when the first and second orientations correspond to machine and tensile directions, the first and second orientations are about 90° apart. In various aspects, the plurality of rolling steps may include rolling the stack 240 in greater than two different orientations (e.g., three different orientations or four different orientations).

Forming the electrode film precursor 268 includes performing at least the first rolling step with the stack 240 in the first orientation (FIG. 5) and the second rolling step with the stack 240 in the second orientation (FIG. 6). However, forming the electrode film precursor 268 may further include additional rolling steps, such as repeating the first and second rolling steps and/or performing additional rolling steps at different stack orientations. In certain aspects, the plurality of rolling steps includes 2-50 rolling steps (e.g., 2-40, 2-25, 2-10, 2-6, 3-5, 4-10, 10-25, 10-15, 15-25, 25-50, 25-35, or 35-50). In one example, the stack 240 is alternately rolled at the first orientation and the second orientation (e.g., first-second-first-second, etc.). However, the stack 240 may alternatively be rolled in different patterns of orientations (e.g., first-first-second-second or first-second-first-first-second).

Performing the sequential rolling steps may facilitate the formation of a 3D binder bonding network, as described below in the discussion accompanying FIG. 11.

Forming an Electrode Film

Returning to FIG. 2, at 126, the method includes forming an electrode film from the electrode film precursor. In certain aspects, forming the electrode film may be referred to as a "final rolling step."

With reference to FIG. 7, a pair of third rollers 280 defining a second or final rolling gap 284 therebetween is provided. The method includes rolling the electrode film precursor 268 between the pair of third rollers 280 to form an electrode film 288. In certain aspects, forming the electrode film may be performed on the same rolling machine as forming the sheet and/or forming the electrode film precursor. The electrode film precursor 268 may be in the first orientation, the second orientation (as shown), or another orientation with respect to the machine direction 222.

The second gap 284 is defined in a direction transverse to a plane of the electrode film precursor 268 (i.e., parallel to the pre-rolling gap 226 and the first gap 264). The second gap 284 is less than or equal to the first gap 264 (FIG. 5). In certain aspects, the second gap 284 is less than the first gap 264. The second gap 284 may be 20 μm-2 mm (e.g., 20-500 μm, 20-100 μm, 100-250 μm, 250-500 μm, 500 μm-1 mm, 500-750 μm, 750 μm-1 mm, 1-2 mm, 1-1.5 mm, or 1.5-2 mm). The second gap 284 is substantially identical to a desired electrode film thickness.

In certain aspects, forming the electrode film 288 optionally includes applying the electrode film precursor to a substrate 292 prior to the rolling. The substrate 292 may be a PET film. The PET film may have a thickness about 10 μm, for example. Disposing the electrode film precursor 268 on the substrate 292 prior to rolling increases a tension strength as the electrode film precursor 268 and the substrate 292 are rolled together. The increased tension strength may allow the rolling to be performed at a higher speed.

In certain aspects, the electrode film 288 may be wound around a core 296 as it exits the third rollers 280 to form an electrode film roll 300. The electrode film roll 300 may alternatively be formed in a separate process.

Drying the Electrode Film

Returning to FIG. 2, at 130, the method includes drying the electrode film. The electrode film is dried to remove at least a portion of the solvent. In certain aspects, drying removes substantially all of the solvent. Drying may be performed in commercial drying machines or chambers. Drying may be performed after forming the electrode film at 126. In certain aspects, the drying is performed before or after the electrode film 288 is rolled onto the core 296. In certain other aspects, drying is performed after forming the electrode assembly at 134 and before assembling the electrochemical cell at 138. In certain aspects, the method may include multiple drying steps, such as at multiple points in the process.

Forming an Electrode Assembly

At 134, the method includes forming an electrode assembly. The electrode assembly generally includes a current collector and at least one electrode film layer. In certain aspects, the electrode assembly includes two electrode layers with the current collector disposed therebetween.

The current collector may be in a form of a foil, a wire mesh, or a meshed foil. The current collector is formed from a conductive material, such as those described in the discussion accompanying FIG. 1. Forming the electrode assembly may include a lamination process and/or a pressing process. The lamination process may be performed on a machine with rollers (FIG. 8) or platens.

Figure 8:
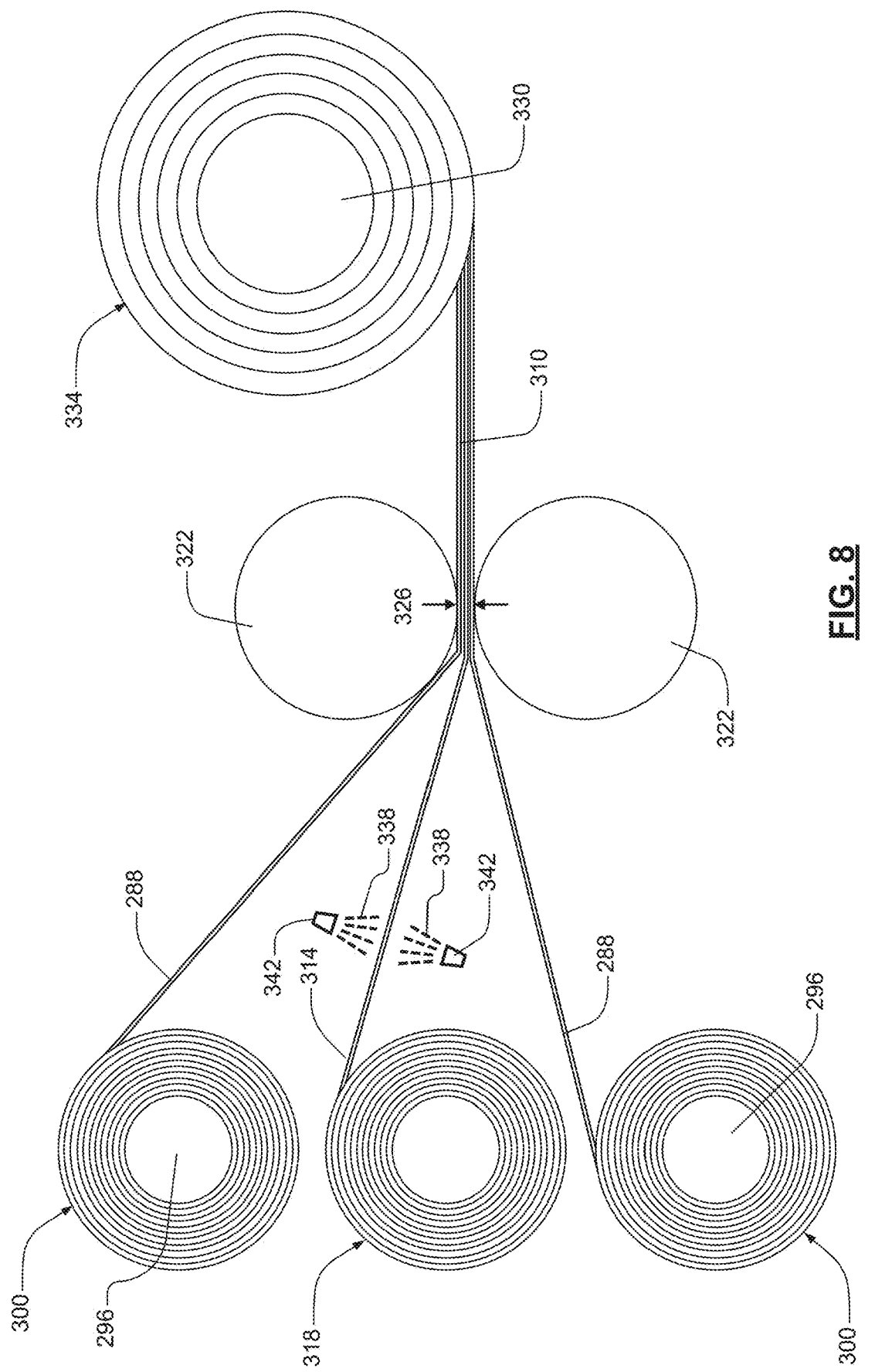
FIG. 8 is a side illustration of a method of forming an electrode assembly according to various aspects of the present disclosure.

With reference to FIG. 8, a method of forming an electrode assembly 310 in a lamination process according to various aspects of the present disclosure is provided. In certain aspects, a current collector 314 is in the form of a foil. The current collector 314 may be provided on a current collector roll 318. The electrode film 288 is provided on the electrode film roll 300. In certain aspects, two electrode film rolls 300 are provided to form a double-sided electrode assembly 310.

The current collector 314 may be disposed between the electrode films 288. Together, the current collector 314 and two electrode films 288 are rolled between a pair of fourth rollers 322 having a third or lamination gap 326 therebetween. The third gap 326 is defined in a direction transverse to the current collector 314 and electrode films 288 (i.e., parallel to the pre-rolling gap 226, the first gap 264, and the second gap 284). The third gap 326 is larger than the second gap 284 (FIG. 7). In certain aspects, the third gap 326 is a sum of thicknesses of the current collector 314 and the two electrode films 288. In certain other aspects, the third gap 326 may be smaller than the sum of thicknesses to achieve a desired electrode press density. In certain aspects, the electrode assembly 310 is wound onto a core 330 after rolling to form an electrode assembly roll 334.

The electrode films 288 may be coupled to the current collector 314 via electrically-conductive glue 338. The conductive glue 338 may be applied to both sides of the current collector 314 via nozzles 342 upstream of the fourth rollers 322. In certain other aspects, the conductive glue 338 is applied to the electrode films 288 or both the electrode films 288 and the current collector 314. The conductive glue 338 may applied via in-line coating, as shown, and/or the current collector 314 and/or electrode films 288 may be pre-coated.

The conductive glue 338 may generally include a polymer and a conductive component. The polymer may generally resist solvent and provide good adhesion. In certain aspects, the polymer includes epoxy, polyimide, PAA, polyester, vinyl ester; thermoplastic polymers (e.g., polyvinylidene fluoride (PVDF), polyamide, silicone, and/or acrylic). In certain aspects, the conductive filler includes carbon materials, (e.g., carbon black, such as SP, graphene, carbon nanotubes, and/or carbon nanofiber) and/or metal powder (e.g., silver, aluminum, and/or nickel). A weight ratio of conductive filler to polymer may be about 0.1-50% (e.g., 0.1-1%, 0.1-0.5%, 0.5-1%, 1-5%, 5-25%, 5-10%, 10-20%, 20-30%, 25-50%, 30-40%, or 40-50%). In certain aspects, a solids content of the conductive glue may be about 5% by weight. In one example, the conductive glue 338 includes SP and PAA at a weight ratio of about ⅓. In another example, the conductive glue 338 includes single-walled carbon nanotubes (SWCNT) and PVDF at a weight ratio of about 0.2%.

In certain aspects, the lamination process may be a hot laminating process. The hot laminating process may be performed at a lamination temperature that is higher than a glass transition temperature of the polymer in the conductive glue 338 (e.g., about 29° C. for PTFE) and lower than a melting point of the polymer. In certain aspects, the lamination temperature is 50-350° C. (e.g., 50-100° C., 100-150° C., 150-200° C., 200-250° C., 250-300° C., or 300-350° C.). In certain aspects, the lamination process includes preheating the electrode film 288 and/or the current collector 314 prior to rolling.

As noted above, forming the electrode assembly may additionally or alternatively include a pressing process. More particularly, the electrode film may be pressed onto the current collector. In certain aspects, the current collector may be a mesh or a meshed foil current collector. The pressing process may be a hot pressing process. An electrode assembly including a mesh current collector may be free of electrically-conductive glue. Therefore, the electrode film may be in direct contact with the current collector.

Assembling an Electrochemical Cell

Returning to FIG. 2, at 138, the method may further include forming an electrochemical cell according to known methods. The electrochemical cell may include a positive and/or negative electrode assembly fabricated according to various aspects of the present disclosure. The electrochemical cell may further include an electrolyte and a separator, as described above in the discussion accompanying FIG. 1.

Electrode

In various aspects, the present disclosure provides an electrode for use an electrochemical cell. The electrode includes an electroactive material, a binder, and a conductive filler. The electroactive material may have a tap density of 3 g/cm$^3$ (e.g., less than or equal to about 2.8 g/cm$^3$, less than or equal to about 2.5 g/cm$^3$, less than or equal to about 2 g/cm$^3$, less than or equal to about 1.5 g/cm$^3$, less than or equal to about 1.4 g/cm$^3$, less than or equal to about 1.3 g/cm$^3$, less than or equal to about 1.2 g/cm$^3$, less than or equal to about 1.1 g/cm$^3$, less than or equal to about 1 g/cm$^3$, less than or equal to about 0.9 g/cm$^3$, less than or equal to about 0.8 g/cm$^3$, less than or equal to about 0.7 g/cm$^3$, less than or equal to about 0.6 g/cm$^3$, less than or equal to about 0.5 g/cm$^3$). In one example, the electroactive material has a tap density of less than or equal to about 2 g/cm$^3$. In another example, the electroactive material has a tap density of less than or equal to about 1.3 g/cm$^3$. In yet another example, the electroactive material has a tap density of less than or equal to about 1 g/cm$^3$. In certain aspects, the electroactive material includes LMFP. The electrode is configured to have a discharge capacity loading of about 0.5-50 mAh/cm$^2$ (e.g., 0.5-10 mAh/cm$^2$, 0.5-2.5 mAh/cm$^2$, 2.5-7.5 mAh/cm$^2$, 2.5-5 mAh/cm$^2$, 5-10 mAh/cm$^2$, 10-20 mAh/cm$^2$, 20-30 mAh/cm$^2$, 30-40 mAh/cm$^2$, or 40-50 mAh/cm$^2$) during cycling of an electrochemical cell including the electrode. In certain aspects, the discharge capacity loading of each active material layer is greater than about 4 mAh/cm$^2$ (e.g., greater than or equal to about 4.5 mAh/cm$^2$, greater than or equal to about 5 mAh/cm$^2$, greater than or equal to about 5.1 mAh/cm$^2$, 5.2 mAh/cm$^2$, 5.3 mAh/cm$^2$, 5.4 mAh/cm$^2$, or 5.5 mAh/cm$^2$). In various aspects, the present disclosure provides an electrode assembly including one or more layers of the electrode ("electrode layers") and a current collector.

With reference to FIG. 9, an electrode assembly 410 according to various aspects of the present disclosure is provided. The electrode assembly 410 includes a current collector 414, two electrode layers 418, and two conductive glue layers 422. In certain other aspects, the electrode assembly 410 includes the current collector 414 and a single electrode film layer 418.

The current collector 414 is disposed between the two electrode layers 418. Each conductive glue layer 422 is disposed between the current collector 414 and a respective electrode layer 418.

In certain aspects, each electrode layer 418 includes an electroactive material, a conductive filler, and a binder. The electroactive material may be included at 80-98% by weight (e.g., 80-85%, 85-90%, 90-95%, or 95-98%). The conductive filler may be included at 0.5-15% by weight (e.g., 0.5-5%, 5-10%, or 10-15%). The binder may be included at 0.5-10% by weight (e.g., 0.5-2.5%, 2.5-5%, or 5-10%).

In certain aspects, each electrode layer 418 defines a first thickness 426 of 20 μm-2 mm (e.g., 20-500 μm, 20-100 μm, 100-250 μm, 250-500 μm, 500 μm-1 mm, 500-750 μm, 750 μm-1 mm, 1-2 mm, 1-1.5 mm, or 1.5-2 mm). The current collector 414 defines a second thickness 430 of 4-40 μm (e.g., 4-10 μm, 4-5 μm, 5-10 μm, 10-25 μm, 10-20 μm, 20-40 μm, 20-30 μm, or 30-40 μm). The conductive glue layers 422 each define a third thickness 434 of 0.5-20 μm (e.g., 0.5-5 μm, 0.5-1 μm, 1-10 μm, 1-5 μm, 5-10 μm, 10-20 μm, 10-15 μm, 15-20 μm). In certain aspects, each electrode layer 418 defines a porosity of 25-65% (e.g., 25-30%, 30-35%, 35-40%, 40-45%, 45-50%, 50-55%, 55-60%, or 60-65%).

In various aspects, the present disclosure provides an electrochemical cell including the electrode assembly 410.

Example 1

Figure 10:
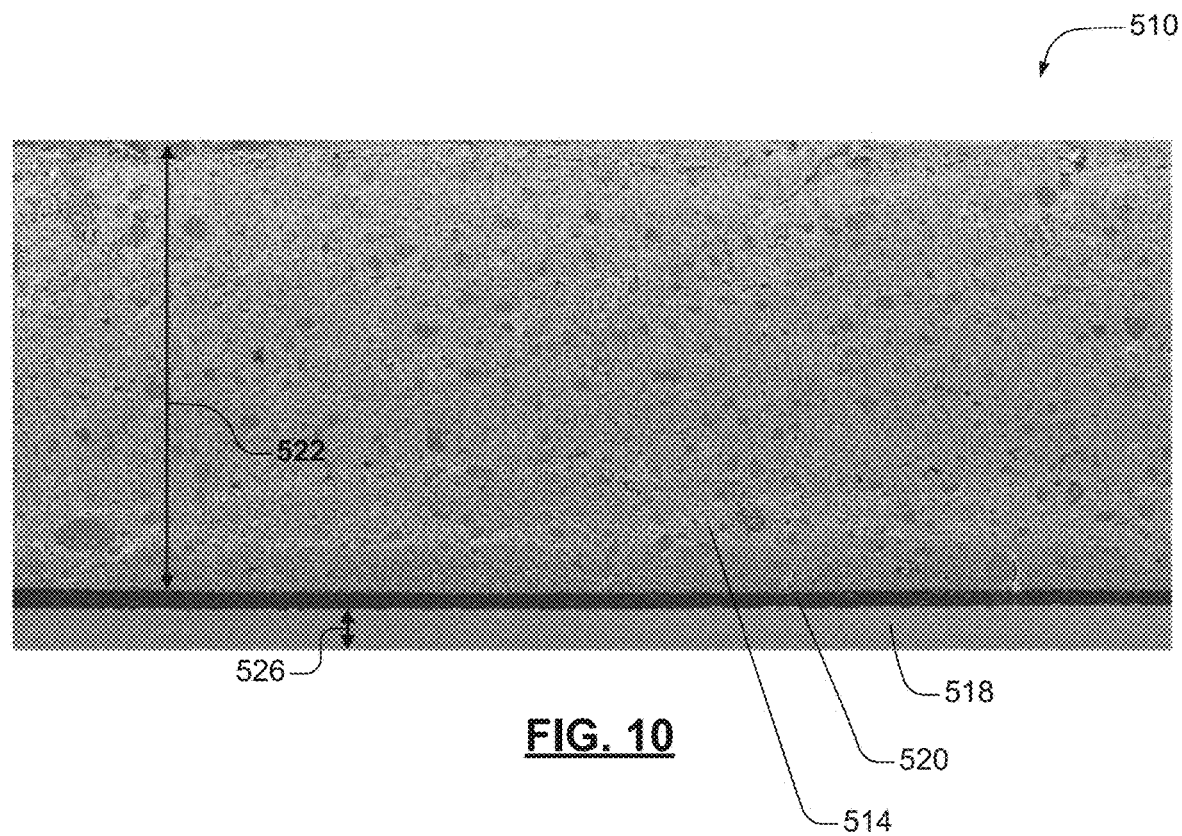
FIG. 10 is a scanning electron microscope (SEM) image of an electrode assembly according to various aspects of the present disclosure.

Referring to FIGS. 10-11, an electrode assembly 510 according to various aspects of the present disclosure is provided. The electrode assembly 510 includes an electrode layer 514, a current collector 518, and an electrically conductive glue layer 520. The electrode layer 514 defines a first thickness of 276 μm. The current collector 518 defines a second thickness 526 of 20 μm. The electrode layer 514 has a discharge capacity loading of about 5.5 mAh/cm$^2$ during cycling of an electrochemical cell including the electrode assembly 510 at a rate of C/10.

The electrode layer 514 includes an electroactive material 544, a conductive filler, and a binder 552. More particularly, the electrode layer 514 includes LMFP as the electroactive material 544, SP and VGCF as the conductive filler, and PTFE and the binder 552. The LMFP is included at about 89% by weight, the SP is included at about 4% SP by weight, the VGCF is included at about 2% by weight, and the PTFE is included at about 5% by weight. The current collector 518 includes aluminum foil. A scale 554 is 2 μm.

The binder 552 forms a 3D binder bonding network including a plurality of non-parallel polymer strands. More particularly, at least a portion of the polymer strands extend substantially parallel to the current collector 518 in a first direction and at least another portion of the polymer strands extend substantially parallel to the current collector 518 in a distinct second direction. The first and second directions may differ by a similar amount as the first and second orientations (see discussion accompanying FIGS. 5-6). In certain aspects, another portion of the polymer strands may extend substantially perpendicular to the current collector 518 (i.e., parallel to a thickness direction 558 of the electrode assembly 510).

The 3D binder bonding network may form a net-like structure. The 3D binder bonding network may facilitate increased contact between electroactive particles and formation of a lower porosity electrode compared to an electrode having binder strands that extend substantially in one or two directions. Thus, resulting electrode may have a higher energy density and active material loading than that of an electrode including similar materials that is formed by a wet coating process. In certain aspects, forming the electrode precursor at step 122 (FIG. 2) may facilitate formation of the 3D binder bonding network. In contrast, an electrode formed via rolling in a single orientation may have binder strands that extend in substantially a single direction or plane.

Example 2

An LMFP-based electrode assembly according to various aspects of the present disclosure is provided. The LMFP-based electrode assembly has substantially the same composition and thickness as the electrode assembly 510 of Example 1. An electrochemical cell includes the electrode assembly, a lithium-metal counter electrode, and a 1.2 M LiPF$_6$ in DMC/EC/EMC (1:1:1 in volume) electrolyte. The electrochemical cell is cycled at a rate of C/10.

Figure 12:
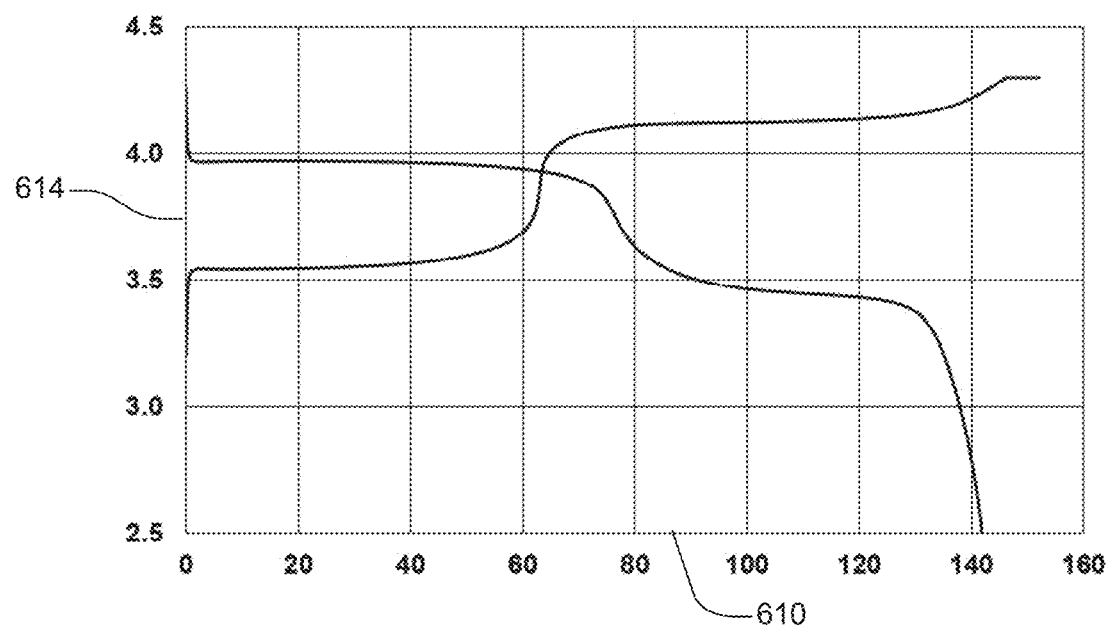
FIG. 12 is a graph of specific capacity and voltage for a half coin electrochemical cell including an electrode according to various aspects of the present disclosure.

Referring to FIG. 12, a graph depicting an initial cycle of the electrochemical cell is provided. An x-axis 610 represents specific capacity in mAh/g. A y-axis 614 represents voltage in V. The electrochemical cell exhibits of first cycle efficiency of about 92%.

Example 3

First and second electrochemical cells according to various aspects of the present disclosure are provided. Both of the electrochemical cells have substantially the same components, compositions, and dimensions of the electrochemical cell of Example 2. Each of the first and second electrodes is cycled in a half coin cell at a C-rate of C/5. A voltage is in a range of 2.5-4.3 V.

Figure 13:
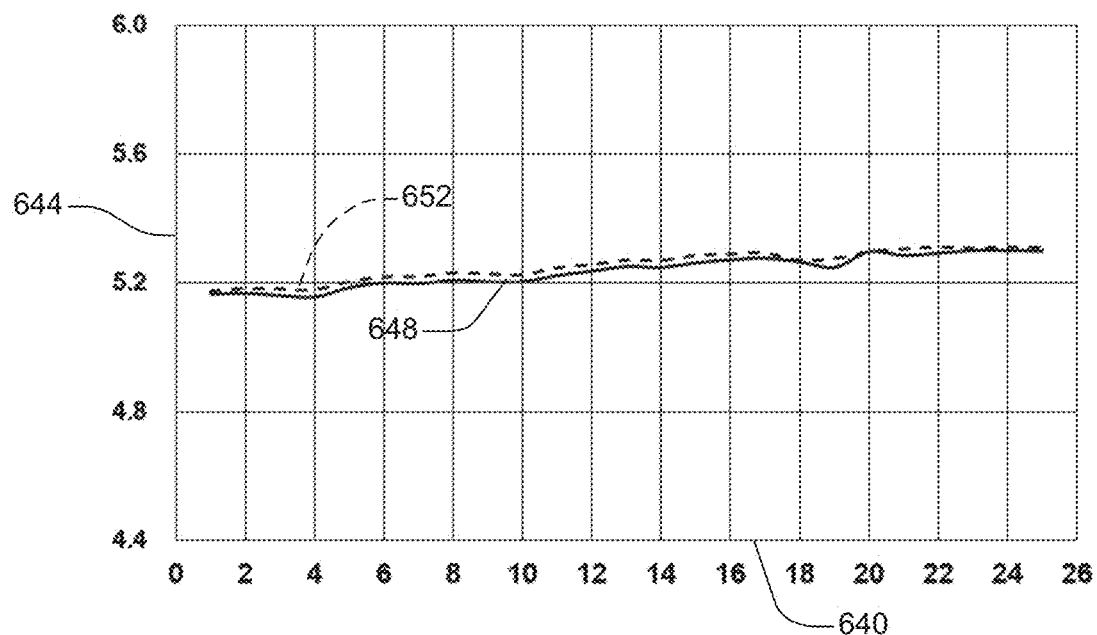
FIG. 13 is a graph showing discharge capacity loading for 25 cycles in a half coin electrochemical cell including an electrode according to various aspects of the present disclosure.

With reference to FIG. 13, a graph depicting cycling performance of the first and second electrochemical cells is provided. An x-axis 640 represents cycle number. A y-axis 644 represents discharge capacity loading in mAh/cm$^2$. A first curve 648 depicts discharge capacity loading of the first electrochemical cell. A second curve 652 depicts discharge capacity loading of the second electrochemical cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing an electrode for an electrochemical cell, the method comprising:
    providing an admixture including an electroactive material, a binder, and a solvent;
    rolling the admixture to form a sheet;
    forming a multi-layer stack from the sheet;
    forming an electrode film precursor by performing a plurality of sequential rollings, each rolling including rolling the multi-layer stack through a first gap defined in a direction transverse to a plane of the multi-layer stack, the plurality of sequential rollings including,
        a first rolling in which the multi-layer stack is in a first orientation with respect to a machine direction, and
        a second rolling in which the multi-layer stack is in a second orientation with respect to the machine direction, the second orientation being different from the first orientation;
    forming an electrode film by rolling the electrode film precursor through a second gap defined in the direction, the second gap being less than or equal to the first gap; and
    drying the electrode film to remove at least a portion of the solvent to form the electrode.

2. The method of claim 1, wherein the second orientation is about 85-95° from the first orientation.

3. The method of claim 1, wherein the electroactive material has a tap density of less than or equal to about 1.3 g/cm$^3$.

4. The method of claim 1, wherein the plurality of sequential rollings includes 2-50 rollings.

5. The method of claim 1, wherein the second gap is less than the first gap.

6. The method of claim 1, wherein the second gap is 20 µm-2 mm.

7. The method of claim 1, wherein the providing includes,
    forming a pre-admixture by admixing the electroactive material and a conductive filler, and
    forming the admixture by lump-mixing the pre-admixture, the binder, and the solvent.

8. The method of claim 1, wherein the providing includes forming the admixture by kneading the electroactive material, a conductive filler, the binder, and the solvent.

9. The method of claim 1, further comprising:
    coupling the electrode to a current collector after the drying.

10. The method of claim 9, wherein the coupling includes,
    p1 disposing an electrically-conductive glue between the electrode and the current collector, and
    hot laminating the electrode to the current collector.

11. The method of claim 10, wherein the hot laminating includes passing the electrode and the current collector having the electrically-conductive glue therebetween through a third gap defined in the direction, the third gap being greater than the second gap.

12. The method of claim 10, wherein the coupling further includes pre-heating the electrode and the current collector prior to the hot laminating.

13. The method of claim 9, wherein
    the current collector is a mesh current collector, and
    the coupling includes pressing the electrode onto the mesh current collector.

14. The method of claim 1, wherein the forming the electrode film includes applying the sheet to a film prior to the rolling.

15. The method of claim 1, wherein the forming the electrode film includes disposing the electrode film precursor on a substrate prior to the rolling.

16. The method of claim 15, wherein the substrate comprises polyethylene terephthalate.

17. The method of claim 1, wherein the first gap is 150 µm-5 mm.

18. The method of claim 3, wherein the electroactive material includes lithium manganese iron phosphate.

* * * * *